United States Patent [19]

Wolverton

[11] Patent Number: 5,137,625
[45] Date of Patent: Aug. 11, 1992

[54] AQUATIC PLANT/MICROBIAL WATER PURIFICATION SYSTEM

[76] Inventor: Billy C. Wolverton, 726 Pine Grove Rd., Picayune, Miss. 39466

[21] Appl. No.: 635,282

[22] Filed: Dec. 28, 1990

[51] Int. Cl.$^5$ .................................................. C02F 3/32
[52] U.S. Cl. ........................ 210/195.1; 210/202; 210/209; 210/259; 210/540; 210/602
[58] Field of Search .............. 210/170, 194, 195.1, 210/202, 205, 209, 259, 519, 523, 532.2, 540, 602, 605, 613, 622; 47/2, 4, 59

[56] References Cited

U.S. PATENT DOCUMENTS

| | | | |
|---|---|---|---|
| 999,747 | 8/1911 | Brown | 210/540 |
| 3,219,189 | 11/1965 | Moore | 210/195.1 |
| 3,429,806 | 2/1969 | Carter et al. | 210/195.1 |
| 4,029,347 | 5/1977 | Seller et al. | 210/195.1 |
| 4,209,388 | 6/1980 | DeFraites | 210/602 |
| 4,243,521 | 1/1981 | Tharp et al. | 210/205 |
| 4,333,837 | 6/1982 | Plósz et al. | 210/747 |
| 4,415,450 | 11/1983 | Wolverton | 210/602 |
| 4,522,722 | 6/1985 | Nicholas | 210/605 |
| 4,536,988 | 8/1985 | Hogen | 210/602 |
| 4,793,929 | 12/1988 | Kickuth et al. | 210/605 |
| 4,959,084 | 9/1990 | Wolverton et al. | 210/602 |

FOREIGN PATENT DOCUMENTS

| | | |
|---|---|---|
| 299590 | 3/1915 | Fed. Rep. of Germany . |
| 441302 | 8/1912 | France . |

Primary Examiner—Stanley S. Silverman
Assistant Examiner—Christopher Upton
Attorney, Agent, or Firm—Alexander F. Norcross

[57] ABSTRACT

A multi-stage active biological waste water treatment Apparatus. An anaerobic, sludge settling first lagoon or chamber has a distributed piping system providing multiple, spaced outlets for the inflow of waste water; the multiple outlets distribute the buildup of sludge within the anaerobic chamber, which otherwise tends to block influent pipe outlets, by shifting flow from one outlet pipe to the next as sludge builds up.

A controlled flow aspirator system then injects air into the odoriferous effluent from the anaerobic chamber as part of the natural water flow out of the anaerobic chamber into the first of a series of biological treatment chambers, without exposing the effluent to local surroundings.

Within an aerobic duckweed treatment chamber, a rotating effluent outflow pipe retains an effective biomass of duckweed for the treatment process, yet, as desired, removes a chosen quantity of this growing biomass for harvesting.

The final treated effluent, substantially free from fecal coliform bacteria, is then partially diverted and recirculated, being sprayed to form an upper layer of substantially pure, fecal coliform free, oxygenated water, covering the anaerobic waste water within the initial anaerobic chamber, eliminating release of odors.

5 Claims, 3 Drawing Sheets

AQUATIC PLANT/MICROBIAL WATER PURIFICATION SYSTEM

BACKGROUND OF THE INVENTION

This in to the field of biologically active water purification systems using combinations of plants and microbial action, and to the physical construction of same.

It is known that biological pollution control systems can be of great effectiveness in purifying organic wastes within water. Typical systems are described in, for example, Wolverton, U.S. Pat. No. 4,959,084 disclosing an air pollution treatment facility flowing air through a waste water fluid and then flowing the combined fluid and pollutants through a combination of rocks, plants and microbes for purification.

One typical plant known to be of special effectiveness in converting and reducing organic contaminants in water go by the typical name of duckweed, a small floating aquatic plant usually found in mixtures of three Genera: Spirodela, Lemna, and Wolffia. Such plants are known to be extremely small floating upon the surface of the water and at a distance look like algae. Since they are not rooted into soil, various devices have been developed to promote and produce a uniform floating coat of these plants on a treatment pond. Typical ones are shown in U.S. Pat. No. 4,536,988 to Hogan disclosing a floating containment barrier grid structure for containing duckweed.

The general field of treatment of waste waters include patents 4,522,722 to Nicholas disclosing subsequential treatment first and anaerobic zone and then flowing the treated liquid through an aerobic zone producing sequentially reduction and oxidation as a method of removing sludge and in dealing with the retained nitrogen and phosphorus in the resulting water.

U.S. Pat. No. 4,209,388 to DeFraites discloses a sewage treatment method in which sequential ponds are gravity fed from a first pond containing algae for aerobic composition followed by a second pool for removal of the algae and a third "polishing" pond which provides an oxidation state.

U.S. Pat. No. 4,333,837 to Plosz, et al discloses a structure and apparatus providing for flow path water, one aquatic plant region and Wolverton, U.S. Pat. No. 4,415,450 disclosing sequential steps of subjecting the waste water to an anaerobic settling step passing the liquid through an anaerobic filter cell once it percolates up to an aerobic treatment stage.

U.S. Pat. No. 4,793,929 to Kikuth discloses a two-stage treatment process and summarizes advances pass the classic activated sludge process for treatment of sewage.

SUMMARY OF THE INVENTION

The invention discloses a structure for a multi-stage active biological waste water treatment apparatus which particularly facilitates multi-stage anaerobic and aerobic treatment of waste water through biological processes to provide a continuing and controlled integrated system for removal and harvesting of excess biomass, removal of nutrients from the waste water and a method of controlling the undesirable odors now present in open anaerobic lagoons.

The apparatus comprises first a unique construction for an anaerobic, sludge settling first lagoon or chamber in which a distributed piping system provides multiple, spaced outlets for the inflow of waste water; the multiple outlets distribute the buildup of sludge within the anaerobic piping system, which otherwise tends to block pipe outlets, shifting flow from one outlet pipe to the next as sludge builds up.

A controlled flow aspirator system then injects air into the odoriferous effluent from the anaerobic chamber as part of the natural water flow out of the anaerobic chamber into the first of a series of biological treatment chambers, without exposing the effluent to local surroundings.

The first treatment chambers typically use duckweed. The invention provides a unique, simple duckweed harvesting apparatus for retaining the growing biomass of duckweed that occurs naturally as a result of the treatment process, yet, as desired, removing a chosen quantity of biomass from the duckweed treatment chambers to a duckweed harvesting chamber, where the biomass may be conveniently separated from the intermediate partially treated wastewater.

A final treatment stage using high density grasses to form a filter mat in an aerobic chamber producing the necessary high surface area for enhanced bacterial action replacing the mechanical filters and rocks of currently known filter and significantly increasing, through plant utilization, the removal of nitrogen, ammonia and nitrate products from the effluent.

The final treated effluent, substantially free from fecal coliform bacteria, is then partially diverted and recirculated, being sprayed to form an upper layer of substantially pure, fecal coliform free, oxygenated water, covering the anaerobic waste water within the initial anaerobic chamber. This surface water serves to substantially eliminate odor release from the anaerobic chamber surface and at the same time provide the necessary agitation at significantly less energy costs than the current waste water aerators.

It further has the advantage over prior art aeration apparatus of not producing an aerosol which would contaminate the atmosphere with disease causing microorganisms which may be present in raw sewerage.

A dual channel system for flow of the waste water allows the waste water to be diverted from one channel to another for the performance of maintenance or the harvesting of grasses.

It is thus an object of the invention to disclose a substantially automatic waste water treatment apparatus which is more resistant than the prior art to a single point buildup of sludge within the initial sludge collection and treatment chamber.

It is a further object of the invention to disclose a waste water treatment apparatus which substantially reduces the release of odors and contaminating microbial organisms from the initial untreated waste water.

It is a further object of this invention to disclose a construction for an anaerobic initial treatment chamber which is substantially free from the release of undesirable odors or microbial contamination.

It is a further object of this invention to disclose a waste water treatment facility which provides a simple, low-cost means of removal and harvesting of duckweed biomass growth resulting from the organic reduction by plants of waste water contaminants.

It is a further object of the invention to disclose a construction for an anaerobic sludge treatment chamber which is resistant to blockage from sludge buildup, and which more evenly distributes sludge deposits.

It is a further object of this invention to disclose a waste water treatment apparatus which is substantially free of odor release, which has substantially reduced opportunity for microbial contamination of the atmosphere, and which provides for the ready harvesting and removal of biomass created during reduction of waste water contaminants.

These and other objects of the invention may be more clearly seen from the detailed description of the preferred embodiment which follows.

DETAILED DESCRIPTION OF THE PREFERRED EMBODIMENT

Figure 1:
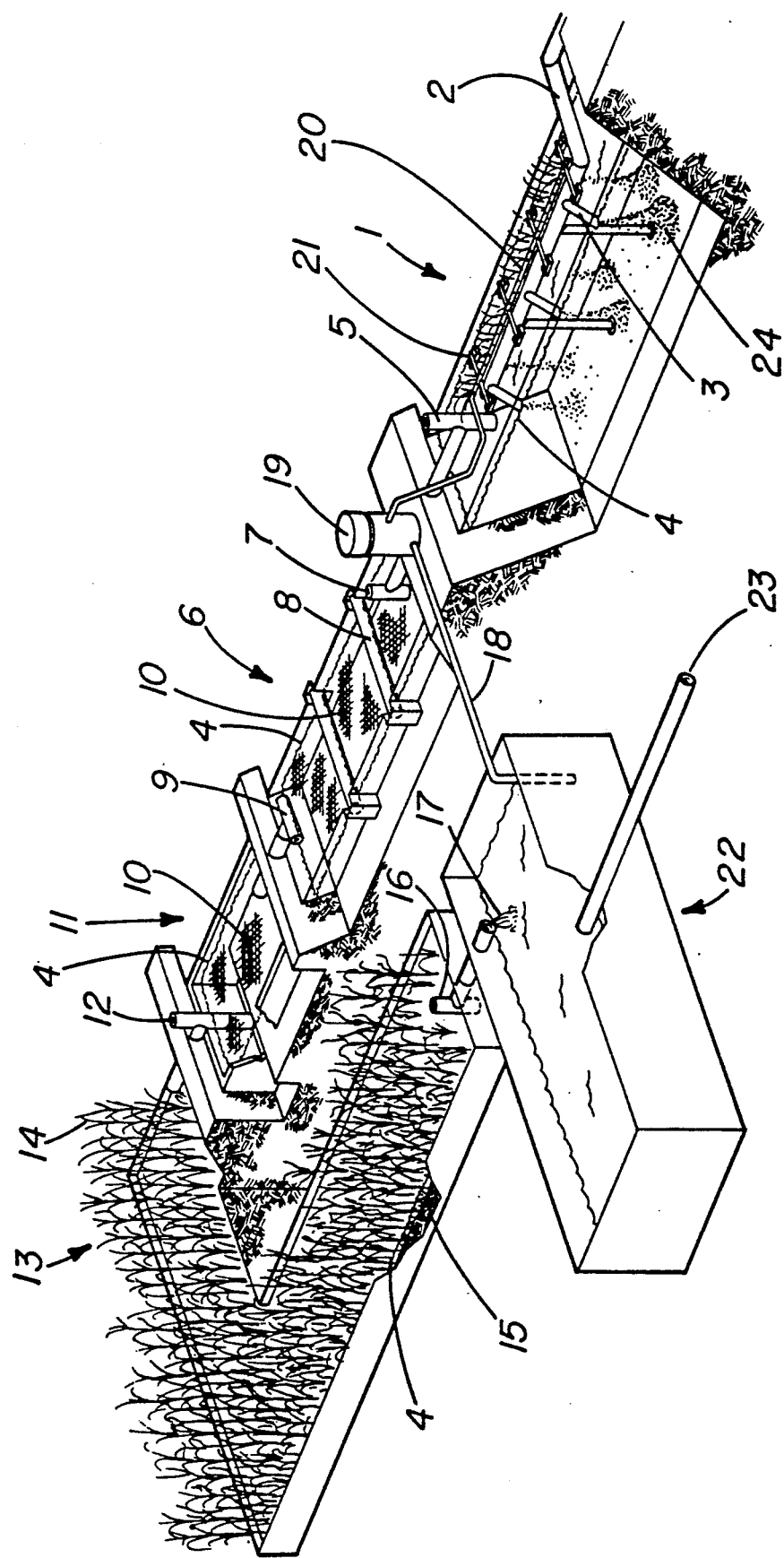
FIG. 1 is an angled view of a single channel of the preferred embodiment of the invention showing in cutaway form the ponds of the invention.

Referring to FIG. 1 I show in an angled view with side section cutaway the apparatus of the invention. Waste water to be treated enters through influent point or piped tube into an anaerobic sludge collection and digestion chamber 1. As is known this waste water is a combination of sludge and organically and chemically contaminated water. Influent to pipe 2 extends horizontally within the water level 4 of the anaerobic chamber 1 periodically emanating from the sides of influent pipe 2 are sludge distribution pipes 3 extending downward at an angle to a midpoint within the water liquid level within an anaerobic chamber 1. Extending parallel to but above influent pipe 2 is a purified water spray pipe 20, which in the preferred embodiment of the invention is an elongate plastic or pvc pipe having a plurality of holes or spray opening on its top surface along its length. These spray holes are provided at varying angles to provide for a spray 25 of purified water as hereinafter described.

Purified water spray pipe 20 is supported at water level 4 within the anaerobic sludge chamber 2 by means of a plurality of floats 21 so that pipe 20 will float at exactly surface level, the spray being just above surface level 4 of the liquid of the anaerobic chamber.

At an end of the anaerobic sludge treatment chamber 1, distal of the entrance of influent pipe 2 is an anaerobic chamber effluent pipe 5. Effluent pipe 5 is a hollow vertical stand of pipe having at an intermediate point a horizontal run of pipe extending through anaerobic chamber walls to a duckweed chamber 6. Waste liquid flowing through anaerobic chamber effluent pipe 5 enters a circulatory aspirator 7 which aerates the effluent prior to its introduction into duckweed chamber 6.

As is known, duckweed is an extremely small floating plant, which, not being rooted in soil, requires mechanical means to form a uniform duckweed coat on the surface of the liquid within duckweed chamber 6; these duckweed colony retainers 8 can be in the form of floating plastic pipes or in the form of other duckweed retention covers or grids as are well known in the art.

At the distal end of duckweed chamber 6 is placed duckweed harvest means 9. Duckweed harvesting means 9 is a rotating T-pipe mounted on an effluent pass-through pipe extending through the wall interconnecting duckweed chamber 6 and harvesting chamber 11.

Duckweed harvesting means 9 may be rotated from a vertical to a horizontal position; in the vertical position, a distal end of harvesting means 9 extends down to within water level 4 of the duckweed chamber 6, permitting the free flow of treated effluent into the harvesting chamber 11 but preventing the flow of any duckweed into harvesting chamber 11, the duckweed floating as a layer upon the top level 4 of the liquid within the duckweed chamber 6. The open end of Duckweed harvesting means 9 serves as a siphon break, preventing siphoning of the Duckweed chamber 6 or back siphoning from duckweed harvesting chamber 11.

Duckweed harvesting means 9 may be rotated to a substantially horizontal position, bringing both openings co-level with liquid level 4 within the duckweed chamber 6. When harvesting means 9 is rotated horizontally, duckweed 10 flows with the liquid effluent into duckweed harvesting means 9 and thence through into harvesting chamber 11 forming a thick layer of collected duckweed 10 within harvesting chamber 11.

The harvesting chamber effluent pipe 12 acts as a separator; extending downward into the level of the water within harvesting chamber 11, it permits liquid effluent to flow into the aquatic plant chamber 13 but prevents escape of duckweed into the aquatic plant chamber 13.

When it is necessary to harvest duckweed due to its growth within duckweed chamber 6, duckweed harvesting means 9 may be rotated to a horizontal position. Duckweed flows readily into harvesting chamber 11 where it can be mechanically removed by skimming or other harvesting techniques as are known in the art.

Figure 3:
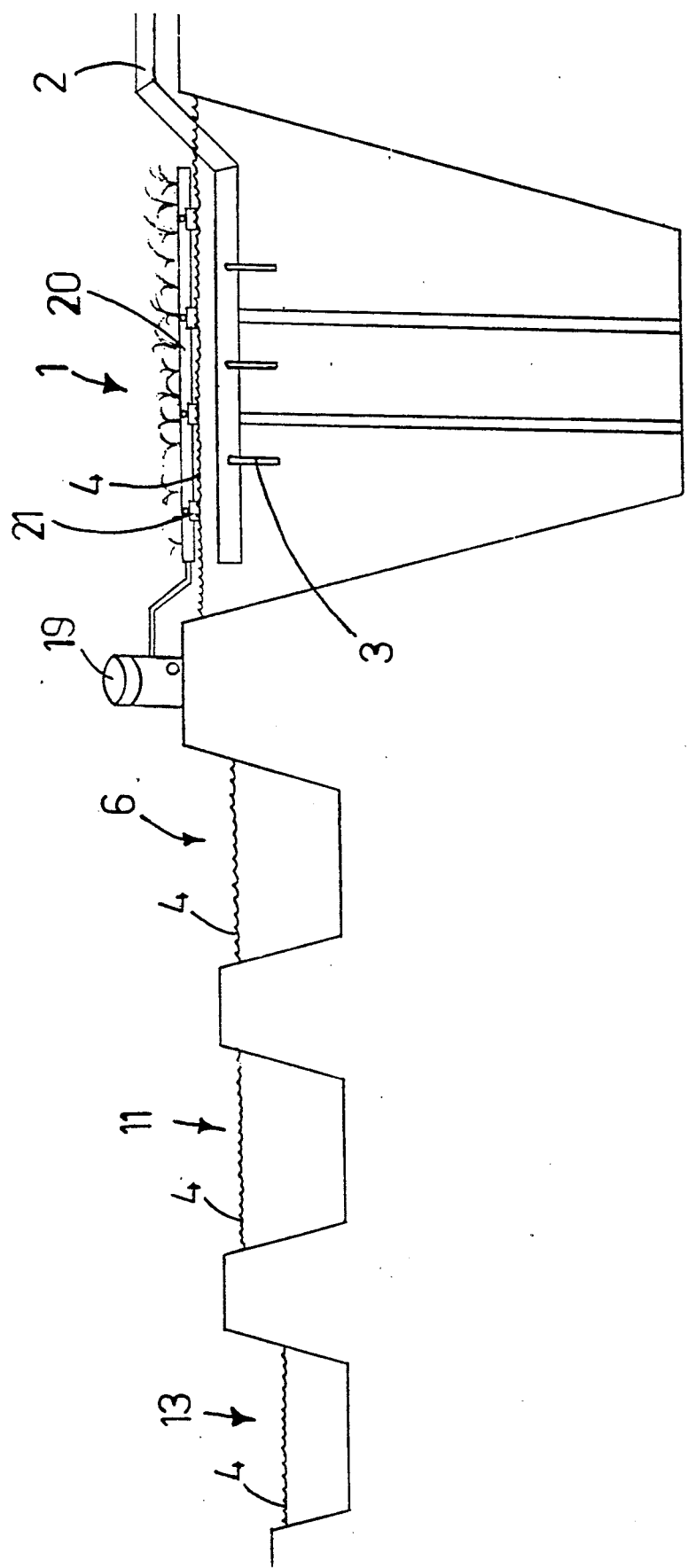
FIG. 3 is a cross-sectional view showing the relative water level in the flow of the invention.

It is to be noted that effluent pipe 5, aspirator 7, duckweed harvesting means 9 when rotated to a vertical position, and duckweed harvesting chamber effluent pipe 12 have vertical openings extending into the air; this provides a siphon break and prevents siphoning from any chamber into the next sequential chamber. All flow of waste water through the apparatus is as a result of water levels induced by flow of influent into pipe 2, not by siphoning, so that desired stepped liquid levels 4 are maintained within each of anaerobic sludge chamber 1, duckweed chamber 6, duckweed harvesting chamber 11, aquatic plant chamber 13, and purified water chamber 22. The positioning of the horizontal through sections of each respective effluent pipe thereby establishes the respective liquid levels 4 within each of the aforesaid chambers and, as shown in FIG. 3, the apparatus is designed so that each chamber is stepped for liquid flow in a downward direction from the highest level being in an anaerobic sludge collection chamber 1 to the lowest level in purified water chamber 22.

Within aquatic plant chamber 13 are provided aquatic grasses such as torpedo grass or switch grass 14 rooted into a soil root area 15 embedded below liquid level 4 within the aquatic plant chamber 13. It has been determined that the provision of aquatic plants 14 which are any of a number of known aquatic grasses having extremely high density and great surface areas, provide for an increased biologically active surface filtration area over the prior rock filters or mechanical filters of the art and thereby provides for an enhanced purification over the filters.

Further, the provision of aquatic grasses in lieu of mechanical rock filtration results in the growth processes of the aquatic grasses removing substantially large amounts of dissolved nitrogen, ammonia and nitrates, thus lessening a known problem in the prior art which had formerly been met by means of chemical filtration, and adds to the microbial reduction of ammonia to nitrates.

Aquatic plant chamber 13 is typically an elongate chamber so as to promote substantial mixing and flow of the waste water within the roots of the provided plants from the point of entrance to a point of exit. The water emitted from the plant chamber 13 through plant chamber effluent pipe 16 is substantially purified, free of fecal coliform and has substantially no remaining organics or ammonia and thus has a very low biological oxygen demand (BOD). This water may be released through purified water release 23 to the environment without damage or harm to the environment.

A purified water take up pipe 18 permits the removal of a portion of the purified water from purified water chamber 22 which is then pumped through lift pump 19 and provided under pressure into purified water spray pipe 20.

Purified water spray pipe 20 then sprays a layer of purified water which forms a floating purified water coat at an upper level above the substantially anaerobic liquid treatment zone within the anaerobic sludge chamber 1.

This spray of purified water provides the necessary upper level aeration formerly provided by waste water aerators; the spray is of purified water, not contaminated waste water and thus if apparition and spray transport in the air transports neither odoriferous by-products such as sulfides nor is there a chance of transporting aerosol borne microbes or bacteria which may well pose a health hazard in the waste water areas of the prior art.

Thus, the most conspicuous and objectionable aspect of a sewerage and waste water treatment plant, the strong and unpleasant odors emitted from the initial stage of anaerobic sludge treatment, are substantially eliminated.

Figure 2:
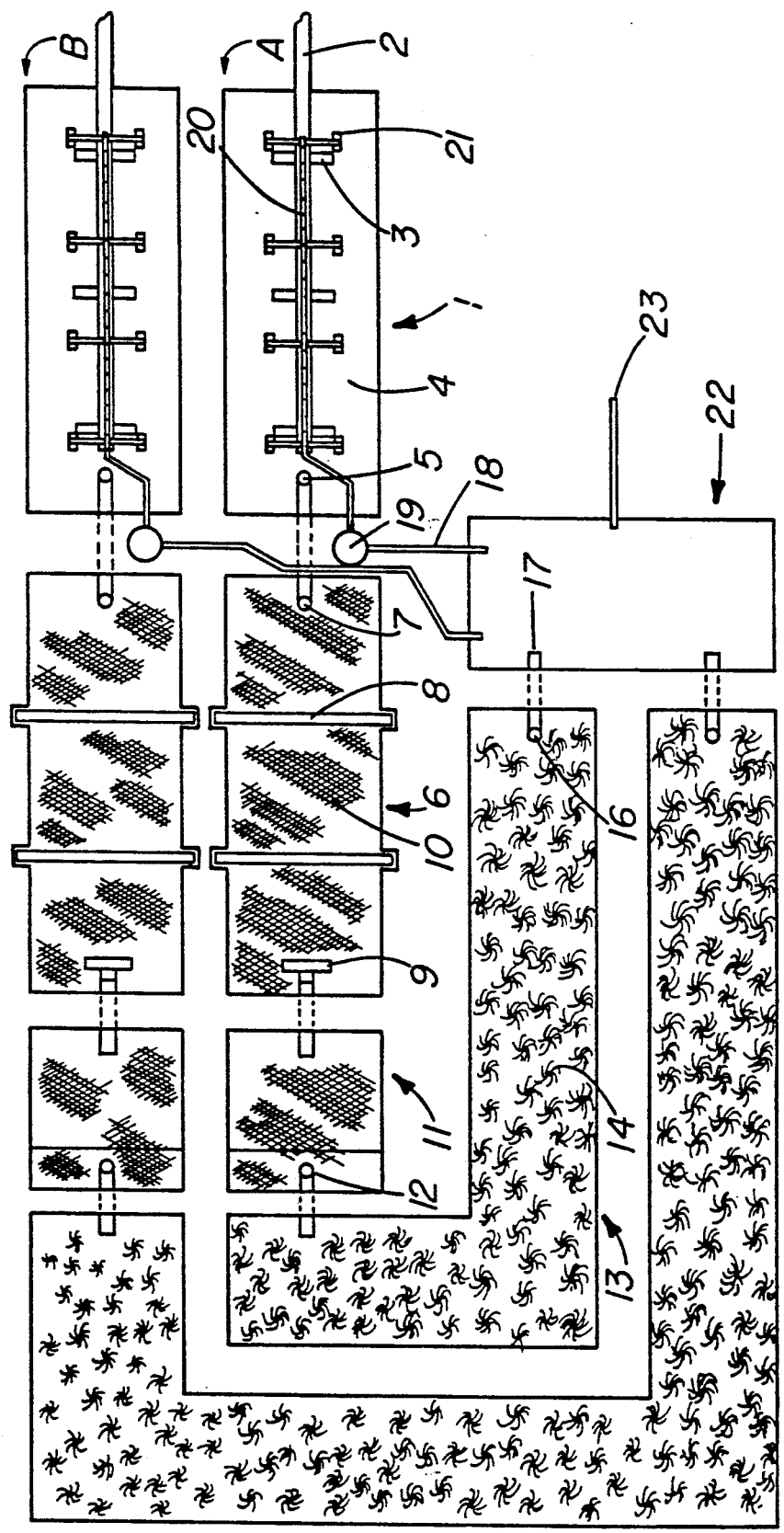
FIG. 2 is a vertical schematic view of a dual channel form of the apparatus of the invention showing two independent flow channels.

In addition, the organically active waste products taken up in the duckweed or in the aquatic grasses and the mineral contaminants which are taken up by the aquatic grasses may be removed by periodic harvesting of the duckweed and the aquatic grasses. To enhance the harvesting of aquatic grasses and to permit ready maintenance it is preferred that the apparatus of the invention be constructed, as shown in FIG. 2 as two parallel channels of treatment, thus providing both redundancy in the event of failure of an individual pump, pipe or connection and permitting one of the two channels to be temporarily taken out of service and drained for necessary maintenance or for aquatic grass harvesting while continuing the treatment of waste water through the alternate channel.

It can thus be seen that the invention as disclosed is particularly advantageous construction for a multistage biologically active waste water treatment facility and the invention extends beyond the specific embodiment given to the variations as are implicit in the claim.

I claim:

1. An apparatus for the purification of wastewater comprising:
   in plant treatment chambers;
   a first chamber containing effluent upon which floats a layer of duckweed;
   a second chamber operatively connected to said first chamber for the flow of effluent thereinto;
   a pipe between said first and said second chambers for said flow;
   said pipe having a rotating cross pipe with opposed open ends thereon in said first chamber;
   said cross pipe having a vertical position in which one open end is inserted in effluent below the floating layer of duckweed and the other open end is raised above the level of effluent and duckweed,
   said cross pipe having a horizontal position in which both open ends are inserted in the layer of duckweed.

2. An apparatus for the purification of wastewater comprising:
   a sludge treatment chamber having:
     a horizontally extending influent supplying pipe;
     a plurality of sludge distribution pipes fluidly connected at intervals to the influent pipe, extending downward therefrom; and
   plant treatment chambers, fluidly connected to said sludge treatment chamber having:
   a first chamber containing effluent upon which floats a layer of duckweed;
   a second chamber operatively connected to said first chamber for the flow of effluent thereinto;
   a pipe between said first and said second chambers for said flow;
   said pipe having a rotating cross pipe with opposed open ends thereon in said first chamber;
   said cross pipe having a vertical position in which one open and is inserted in effluent below the floating layer of duckweed and the other open end is raised above the level of effluent and duckweed;
   said cross pipe having a horizontal position in which both open ends are inserted in the layer of duckweed.

3. The apparatus of claim 2 further comprising:
   in said sludge treatment chamber:
     means for forming an aerated layer of water covering an upper level of said sludge treatment chamber.

4. The apparatus of claim 2 further comprising:
   in said sludge treatment chamber:
     a purified water supply pipe extending above and parallel to the influent supplying pipe;
     a pressurized source of purified water fluidly connected to said purified water supply pipe;
     means in said purified water supply pipe for spraying a level of purified water onto the upper level of said sludge treatment chamber.

5. The apparatus of claim 4 further comprising
   an effluent removing pipe fluidly connected to said sludge treatment chamber,
   said effluent removing pipe having a fluid receiving opening extending downward into the level containing an anaerobic effluent;
   said effluent removing pipe having a fluid exit into said first plant treatment chamber;
   means within said effluent removing pipe for aerating said effluent during flow to said first plant treatment chamber.

* * * * *